Nov. 7, 1933.   W. J. SIX   1,933,568
METHOD OF MAKING PISTON RINGS
Filed July 24, 1930   2 Sheets-Sheet 1

INVENTOR.
Walter J. Six.
BY
Fay, Oberlin & Fay
ATTORNEYS.

Nov. 7, 1933. W. J. SIX 1,933,568
METHOD OF MAKING PISTON RINGS
Filed July 24, 1930 2 Sheets-Sheet 2
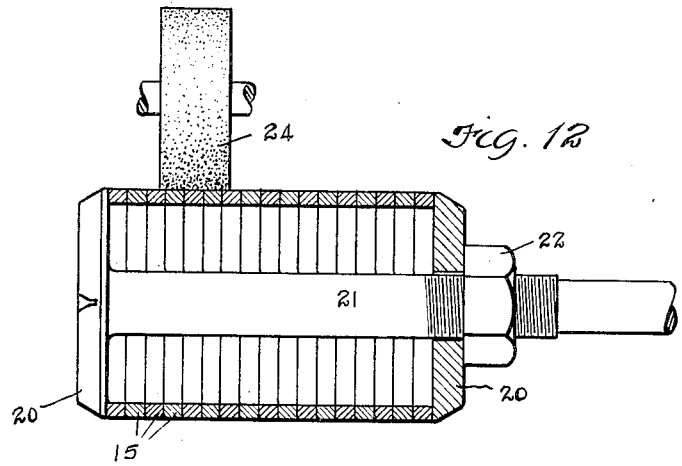
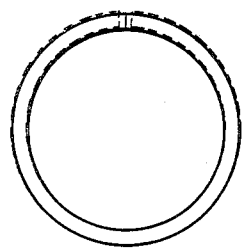
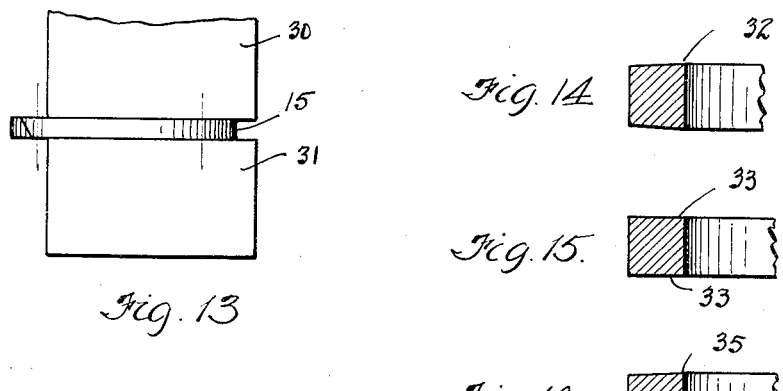
INVENTOR.
Walter J. Six.
BY
Fay, Oberlin & Fay
ATTORNEYS.

Patented Nov. 7, 1933

1,933,568

UNITED STATES PATENT OFFICE 1,933,568

METHOD OF MAKING PISTON RINGS

Walter J. Six, Indianapolis, Ind.

Application July 24, 1930. Serial No. 470,273

3 Claims. (Cl. 29—156.6)

The present invention, relating as indicated to piston rings, is directed to a new and improved packing ring for pistons and to a new and improved method of manufacturing the same. The principal object of the present invention is the provision of a packing ring of hard, resilient material such for example as steel, either of the ordinary grades or of an extremely hard type, such for example as so-called "nitralloy", that is steels subjected to a nitriding treatment. The general purpose of the invention is to provide a packing ring of very much improved wearing qualities and one which will hold its temper and resilience longer than the ordinary cast iron rings now in general use.

To the accomplishment of the foregoing and related ends, said invention, then, consists of the means and steps hereinafter fully described and particularly pointed out in the claims; the annexed drawings and the following description setting forth in detail certain means and one mode of carrying out the invention, such disclosed means and mode illustrating, however, but one of various ways in which the principle of the invention may be used.

Figure 1:
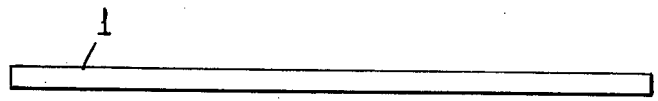
Figure 2:
Figure 3:
Figure 4:
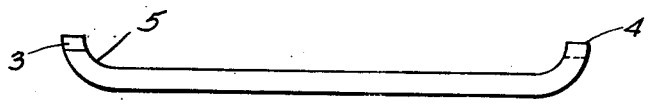
Figures 5, 6:
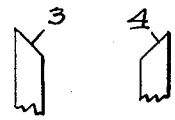
Figure 7:
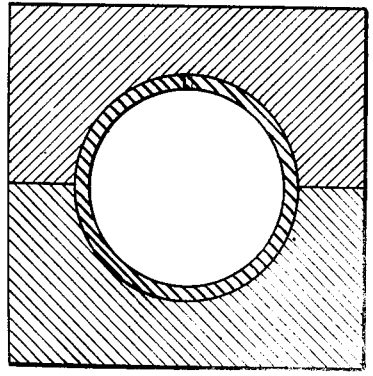
Figure 8:
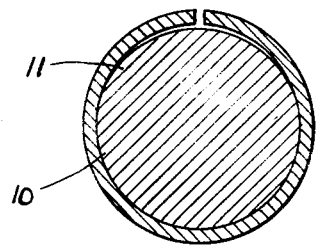
Figure 9:
Figure 10:
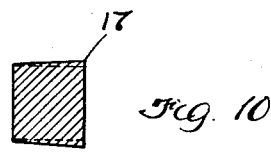
Figure 11:
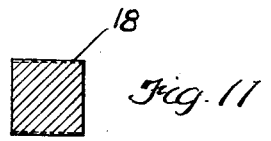

Fig. 1 is a side elevation of the strip of rolled sheet metal such as steel from which my improved ring may be made; Fig. 2 is a transverse section of the same; Fig. 3 is a side elevation of a blank cut from the strip of stock ready for formation into a ring; Fig. 4 is a similar view showing the blank after the preliminary forming operation; Figs. 5 and 6 are end elevations of the two ends of the partially formed blank of Fig. 4; Fig. 7 is a transverse vertical section through the forming dies showing the ring formed into cylindrical shape; Fig. 8 is a similar view showing the ring as formed in the dies of Fig. 7 mounted upon a mandrel for heat treatment; Fig. 9 is an end elevation of the ring after heat treatment; Fig. 10 is a transverse section of the same; Fig. 11 is a similar section of the ring after grinding; Fig. 12 is a transverse vertical section illustrating a simple apparatus after grinding a plurality of rings externally at the same time; Fig. 13 is a front elevation illustrating a squeezing operation which may be formed upon the ring to reduce the amount of side grinding; Fig. 14 is a section through the ring before the operation of Fig. 13; Fig. 15 is a similar view after such operation; Fig. 16 is a similar view of that portion of the ring which is not subjected to the squeezing operation of Fig. 13; Fig. 17 is a plan view of the completed ring; Fig. 18 is a side elevation of a modified form of strip which may be employed in my improved process; Fig. 19 is a transverse section of the same; Fig. 20 is a plan view showing the strip after the formation of the slots therein; and Fig. 21 is a plan view illustrating still another modified form of strip.

Referring now to Figs. 1 to 8, inclusive, I have shown the various steps in the manufacture of a packing ring of my improved design by my new method. I start with flat sheet stock in the form of a sheet 1 of rectangular cross-section, as shown in Fig. 2, of approximately the cross-section of the desired finished ring, allowing of course enough extra stock to permit of the finishing and forming operations, which will hereinafter be described.

From this strip or sheet I cut blanks 2 provided with beveled ends 3 and 4, these ends being shown in Figs. 4, 5 and 6. The blank 2 is then preliminarily bent into the form shown in Fig. 4 with its end portions 5 bent up in the manner indicated, giving them a preliminary curvature which materially assists in the easy formation of the ring of the blank into cylindrical form in the final forming operation, which is shown in Fig. 7. It will be understood that between the operations of Figs. 4 and 7 other intermediate forming operations may be inserted and the blank may be bent into U or channel shape in these intermediate operations before being formed into the completed cylinder, which is shown in Fig. 7.

After the formation of the cylindrical ring one or more of the rings are mounted in the manner indicated in Fig. 8 upon a mandrel 10 having the circumferential portion 11 relieved or ground off. The mandrel is of slightly larger size than the inside diameter of the ring placed thereon, which causes an expanding or stretching of the ring.

After the rings have been heat treated in the manner indicated they are removed from the mandrel and are then in a condition for sizing to the final dimensions. In Fig. 9 I have shown one of the rings 15 after the heat treatment and have shown in dotted lines 16 the portion which must be removed from the edges of the ring in order to bring the faces into parallelism and to the required dimensions. It will be understood that in the forming of the flat strip into the circular ring the inner edge 17 of the ring is compressed and thickened slightly, as indicated in Fig. 10. This excess material must be removed in order to bring the faces of the ring into a parallel condition and this may be done by grinding the opposed faces of the ring in any suitable manner. By this grinding operation the opposed faces 18 of the ring are brought into a perfectly flat parallel condition.

It is also necessary that the rings be brought to a perfectly smooth and cylindrical condition and this may be conveniently accomplished by mounting a plurality of the rings 15 between end plates 20 which are secured on a central support or mandrel 21. In Fig. 12 I have shown a series of rings concentrically mounted about the support 21 and clamped tightly together by the adjustment of one of the end plates 20, which is then locked in position by a nut 22. The external surface of all of the rings so clamped may then be ground by a grinding wheel 24 which is moved longitudinally of the rings until they have been brought to the required dimensions.

The rings are then in a finished condition, having been accurately ground on their side and outer surfaces to exact dimensions and to a smooth finish, and having been formed so that they exert an even uniform pressure radially against the surface of the cylinder in which they are mounted.

A modification of the process already described consists in taking the rings at the stage represented in Fig. 8, giving the same a sufficient heat treatment to normalize the metal only and then squeezing the ring 15 between dies 30 and 31 operating upon that portion of the ring which is in contact with the truly cylindrical portion of the mandrel 10. If the entire ring is squeezed between the dies 30 and 31 it causes an opening up of the split portion, but a squeezing of the portion stated merely flattens out the edges 32 which have already been referred to, bringing the faces 33 and 33 of the ring into parallelism, after which these surfaces can be ground to remove any excess stock, the grinding also removing the raised edges or corners 35 (see Fig. 16) of the unsqueezed portion of the ring 15. In this way a portion of the grinding operation can be omitted, although it will still be necessary to grind the outside of the ring, after which the entire ring is subjected to a nitriding treatment which gives an extremely hard, long-wearing surface to the metal without distorting the ring and without making it necessary to apply any subsequent operations after the nitriding treatment. In this way there may be formed a ring of "nitralloy" and the use of a ring of this character not only gives a much longer life to the ring, but also less wear and a longer life to the cylinder wall against which it operates.

In Fig. 19 I have shown a modified form of rolled steel strip which may be employed in my improved process. This strip 50 is provided with a narrow groove 51 centrally disposed in one side and extending the entire length of the strip and may be formed in the strip when the latter is rolled. Slots 52 are then formed by punching or rolling through the bottom of the groove 50, or if desired holes 53 (see Fig. 21) may be formed instead of the rectangular slots already described. Flat stock or strip after the formation of the slots or holes is then formed into a ring by the processes already described, producing a ring having an encircling groove in its outer surface and a series of openings extending through the bottom wall of the groove into the interior of the ring. The advantages of this type of ring will be readily understood by those familiar with the manufacture and use of piston rings, and it will be readily appreciated that rings of the cross-sectional contour just described can be formed of the same material and by the same methods as the plain rings already described herein.

My improved method produces, in a convenient and economical manner, a steel packing ring which has long been desired because of its longer life, longer temper, and the lesser amount of wear on the surface against which it operates.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of manufacturing steel piston rings, the steps of bending a strip of flat stock of a length equal to the circumferential length of the finished ring into truly circular form so as to bring the ends of said strip substantially into engagement with each other, slightly expanding said ring, heat treating said ring while in expanded condition, and then grinding the radial surfaces of said ring into parallelism.

2. In a method of making steel piston rings, the steps of bending a strip of flat stock of a length equal to the circumferential length of the finished ring into truly circular form so as to bring the ends of said strip substantially into engagement with each other, slightly expanding said ring, heat treating said ring while in expanded condition, subjecting a portion of the ring to endwise pressure to bring the opposite radial surfaces of said portion into approximate parallelism, grinding the unpressed portion of the ring to bring the radial surfaces thereof into accurate parallelism, and then finishing the external circumference of the ring to predetermined dimensions.

3. In a method of manufacturing steel piston rings, the steps of bending a strip of flat stock of a length equal to the circumferential length of the finished ring, into truly circular form so as to bring the ends of said strip substantially into engagement with each other, expanding said ring to a diameter greater than normal, heat treating said ring while in expanded condition, subjecting all but a portion of said ring adjacent the split therein to endwise pressure to bring the opposite radial surfaces of the portion thus pressed into approximate parallelism, grinding the radial surfaces of the remaining portion to bring them into accurate parallelism, and then finishing the external circumference of the ring to predetermined dimensions.

WALTER J. SIX.